(12) United States Patent
Jones

(10) Patent No.: US 8,317,414 B2
(45) Date of Patent: Nov. 27, 2012

(54) DOME CAMERA ENCLOSURE WITH VIRTUAL TILT PIVOT MECHANISM

(75) Inventor: Theodore L Jones, Akron, PA (US)

(73) Assignee: Robert Bosch GmbH, Stuttgart (DE)

( * ) Notice: Subject to any disclaimer, the term of this patent is extended or adjusted under 35 U.S.C. 154(b) by 145 days.

(21) Appl. No.: 12/859,468

(22) Filed: Aug. 19, 2010

(65) Prior Publication Data

US 2012/0045197 A1  Feb. 23, 2012

(51) Int. Cl.
  *G03B 17/00* (2006.01)
(52) U.S. Cl. ........................................ 396/427
(58) Field of Classification Search .................. 396/427
  See application file for complete search history.

(56) References Cited

U.S. PATENT DOCUMENTS

| | | |
|---|---|---|
| 4,821,043 A | 4/1989 | Leavitt |
| 5,394,209 A | 2/1995 | Stiepel et al. |
| 5,765,043 A | 6/1998 | Tyler |
| 6,715,940 B2 | 4/2004 | Top et al. |
| 7,101,095 B2 | 9/2006 | Kajino et al. |
| 7,324,747 B2 | 1/2008 | Kempas |
| 2004/0021785 A1 | 2/2004 | Pshtissky et al. |
| 2006/0017842 A1* | 1/2006 | Jun .................. 348/373 |
| 2007/0041726 A1* | 2/2007 | Lee .................. 396/427 |
| 2007/0053681 A1* | 3/2007 | Arbuckle ............ 396/427 |
| 2008/0013944 A1* | 1/2008 | Yamane et al. ...... 396/427 |
| 2008/0056708 A1 | 3/2008 | Kim |
| 2008/0181600 A1* | 7/2008 | Martos ............... 396/427 |
| 2008/0231699 A1 | 9/2008 | Konishi et al. |

* cited by examiner

*Primary Examiner* — Clayton E LaBalle
*Assistant Examiner* — Dennis Hancock
(74) *Attorney, Agent, or Firm* — Taft Stettinius & Hollister LLP; Keith Swedo

(57) ABSTRACT

A surveillance camera arrangement includes a substantially spherical enclosure having a substantially round optical region. The optical region has better optical qualities than a remainder of the enclosure. A camera is disposed within the enclosure. The camera has a lens with an optical axis extending approximately through a midpoint of the optical region. An actuatable mechanism is coupled to the enclosure and to the camera. The mechanism pivots both the enclosure and the camera in both pan and tilt directions such that the optical axis of the camera remains substantially aligned with the midpoint of the optical region.

15 Claims, 13 Drawing Sheets

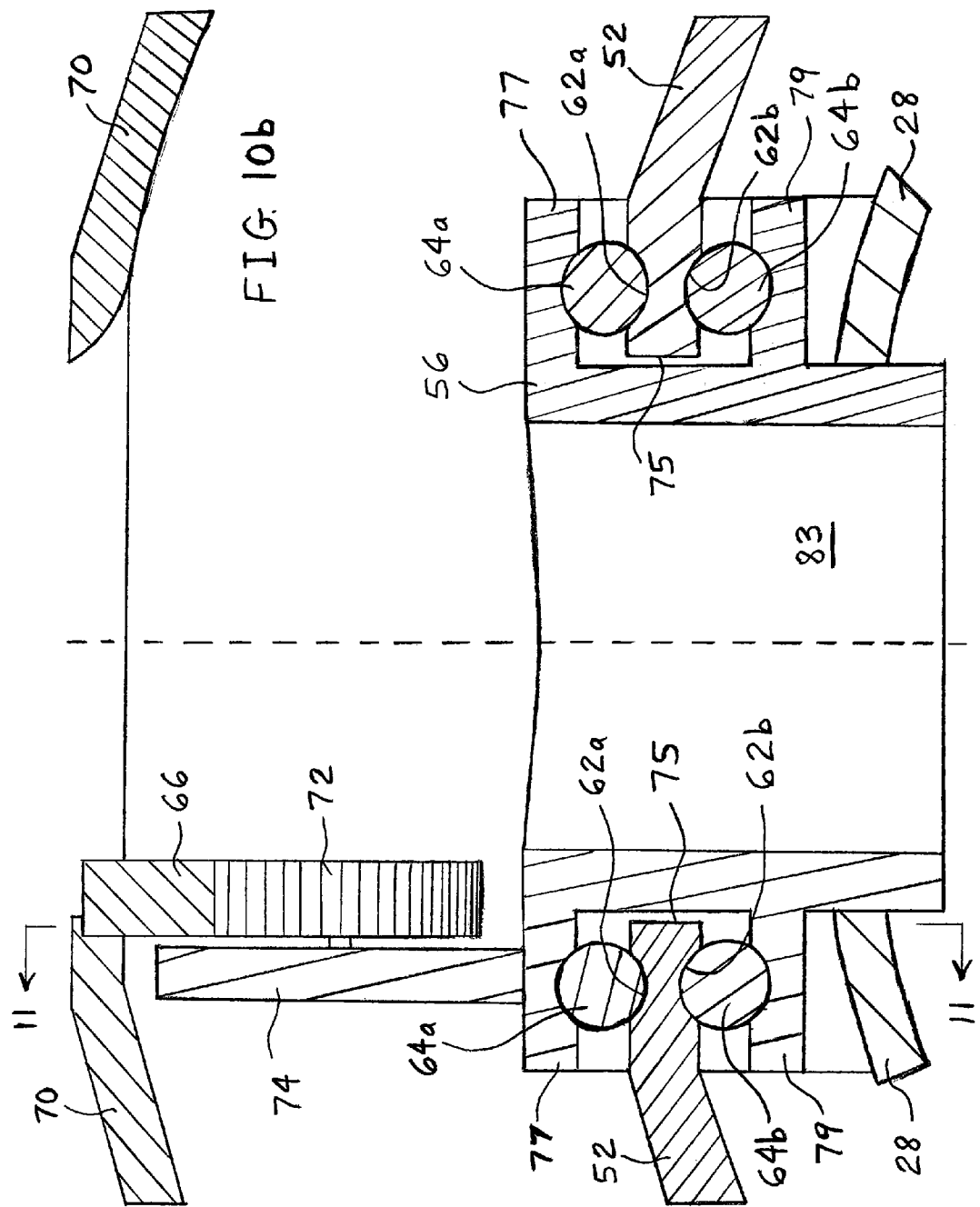

DOME CAMERA ENCLOSURE WITH VIRTUAL TILT PIVOT MECHANISM

BACKGROUND OF THE INVENTION

1. Field of the Invention

The present invention relates to security cameras, and, more particularly, to security cameras that are concealed within a hemispherical dome.

2. Description of the Related Art

Surveillance camera systems are commonly used by retail stores, banks, casinos and other organizations to monitor activities within a given area. The cameras are often provided with the capability to pan and tilt in order to acquire images over a wide domain. The tilt of the camera generally refers to the pivoting of the camera about a horizontal axis that is parallel to the floor, such that the lens of the camera may tilt between an upwardly pointing position and a downwardly pointing position. The pan of the camera refers to the rotation of the camera about a vertical axis that is perpendicular to the floor, such that the lens may scan from side to side. The cameras may also be able to zoom in order to reduce or enlarge the field of view. Oftentimes, each camera is linked to video display units in a security surveillance room with surveillance personnel monitoring the multiple video display units.

Surveillance cameras may be mounted within a hemispherical dome window constructed of a material that is transparent when viewing outward and only partially transparent when viewing inward to inhibit unauthorized individuals from determining the area being viewed by the camera. Similarly to sunglasses, the window may be tinted or provided with a thin metalized layer.

The prior art pendant housing shown in FIGS. 1-3 includes a clear window that is stationary relative to the camera pan/tilt/zoom movement inside. The clear window is hemispherical in shape and is mechanically engaged with the aluminum housing in a manner that compresses a static rubber seal to prevent ingress of water and dust. The objective diameter of the camera lens requires the lens optical axis to be offset from the geometric center of the hemispherical window in order for the camera to view entirely through the hemisphere at a horizon (i.e., horizontal or 0 degree tilt angle).

Advantages of static hemispherical windows include: a) a cost-effective means of meeting basic requirements of environmental protection, and b) the covertness afforded by the outer surface of the window not moving when the camera moves. However, when high-zoom lenses and/or high definition imagers are used, a static hemispherical window has significant optical limitations: first, refractive distortions are introduced by the offset of the lens optical axis from the geometric center of the hemispherical window; second, variations in the local optical properties of the hemispherical window are more noticeable as the lens moves (panning and tilting) relative to the window; and third, convection of air and moisture inside the window can introduce optical variations. In addition, the production of a hemispherical shape using the cost-effective plastic injection-molding process further limits optical performance due to: first, geometric limitations associated with injection molding a hemispherical shape; second, optical properties of plastics such as PMMA (acrylic) or PC (polycarbonate) vs. glass; third, molded-in stress that creates localized optical distortions; and fourth, limited application of coatings to enhance optical performance.

The window may have a compound shape including a hemisphere and a cylindrical section per U.S. Pat. No. 7,306,383 and Japanese Patent Publication 2006-033704. However, if the lens optical centerline was shifted to the geometric center of the hemisphere, there would be distortion visible when viewing the horizon due to the transition from hemispherical to cylindrical, and additional refractive distortion in the cylindrical section.

Some of the limitations of a stationary hemispherical window can be overcome by attaching the window to the same moving pan stage that supports the camera lens tilt pivot, as shown in FIGS. 4 and 5. The lens still tilts relative to the window, however, so the optical viewing area of the window is a curved strip of the hemisphere, as shown in FIG. 6.

Problems associated with the design of FIGS. 4-6 include: a) variations in local optical properties are visible as the lens tilts relative to the window; and b) convection of air and moisture inside the dome can introduce optical variations. Additionally, the production of a curved hemispherical strip shape using the cost-effective injection molding process further limits optical performance due to: first, the poorer optical properties of plastics such as PMMA (acrylic) or PC (polycarbonate) as compared to glass; second, the molded-in stress that creates localized optical distortions; and third, the limited application of coatings to enhance optical performance.

The region shown in FIG. 6 does not need to be a separate part. As shown FIGS. 4-5, the "eyeball" could be split on an angle to provide horizon-to-vertical tilt range viewing through a simple, and therefore easily manufactured, hemisphere. The pan bearing may be placed at the top where the "small diameter moving pan seal" is noted. The benefits of a small diameter seal include cost and lower friction for the pan drive to overcome. The slip ring may also be located in this area.

What is neither disclosed nor suggested by the prior art is a dome camera system that overcomes the above-described problems with the prior art.

SUMMARY OF THE INVENTION

The present invention provides a dome camera enclosure in which the lens and dome window may be fixedly attached together. The viewing region may be reduced, but both the camera lens and the window optical region may move around the pan and tilt axes while still maintaining a streamlined dome appearance.

The camera lens may be enclosed in a hemispherical-shaped "eyeball" housing with the small optical region aligned with the lens optical axis. This eyeball assembly can be formed by two hemispheres, or more than two segments of a hemisphere, as convenient. The joints between the parts that form the eyeball may be minimized to present the appearance of a contiguous sphere, so that it is difficult to distinguish movement during panning and tilting of the camera.

The invention comprises, in one form thereof, a surveillance camera arrangement including a substantially spherical enclosure having a substantially round optical region. The window has better optical qualities than a remainder of the enclosure. A camera is disposed within the enclosure. The camera has a lens with an optical axis extending approximately through a midpoint of the optical region. An actuatable mechanism is coupled to the enclosure and to the camera. The mechanism pivots both the enclosure and the camera in both pan and tilt directions such that the optical axis of the camera remains substantially aligned with the midpoint of the optical region.

The invention comprises, in another form thereof, a surveillance camera arrangement including a substantially spherical enclosure having an optical region. The optical region has better optical qualities than other portions of the enclosure. A camera is disposed within and is fixedly attached to the enclosure. The camera has a lens with an optical axis extending through one optical region. An actuatable tilt mechanism is coupled to the enclosure and to a non-tiltable structure. The tilt mechanism pivots the enclosure in tilt directions relative to the non-tiltable structure.

The invention comprises, in yet another form thereof, a surveillance camera arrangement including a substantially spherical enclosure having an optical region. The optical region has better optical qualities than other portions of the enclosure. A camera is disposed within and fixedly attached to the enclosure. The camera has a lens with an optical axis extending through one optical region. A non-tiltable structure includes an arcuate bottom wall having an arcuate slot oriented in a tilt direction. The bottom wall is adjacent to and conforms to a portion of an outer surface of the spherical enclosure. An arcuate top wall is substantially equidistant from the bottom wall. A coupling is attached to the enclosure and slidably received in the slot of the bottom wall. A motor is attached to the coupling and disposed between the bottom wall and the top wall. A pinion is drivably coupled to the motor. A rack is attached to a bottom surface of the top wall and meshingly engaged with the pinion.

An advantage of the present invention is that having the optical region and lens rotate in conjunction about the pan and tilt axes provides optical performance improvements of the dome window shape in multiple ways: first, the geometric center of the optical region can be maintained in alignment with the lens axis, thus minimizing refractive distortion; and second, the smaller size of the optical region allows optimization of manufacturing processes to provide incremental improvements in optical performance in the optical region.

Another advantage is that there is no relative movement between the camera lens and the window, and thus any optical variations in the window are not visible to the camera.

Yet another advantage is that it is possible to use window materials that are more ideal (e.g., have better optical properties), such as glass.

Still another advantage is that if plastics are used as the window material, then optical distortion due to molded-in stress is reduced.

A further advantage is that the optical region is small, and it is easier to apply coatings to a smaller part in order to enhance optical performance.

Another advantage is that, because the lens is always in the same position relative to the window, it is easier to mitigate the convection of air and resulting moisture between the lens and the window.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 10b is an enlarged view of the coupling of FIG. 10a.

Figure 1:
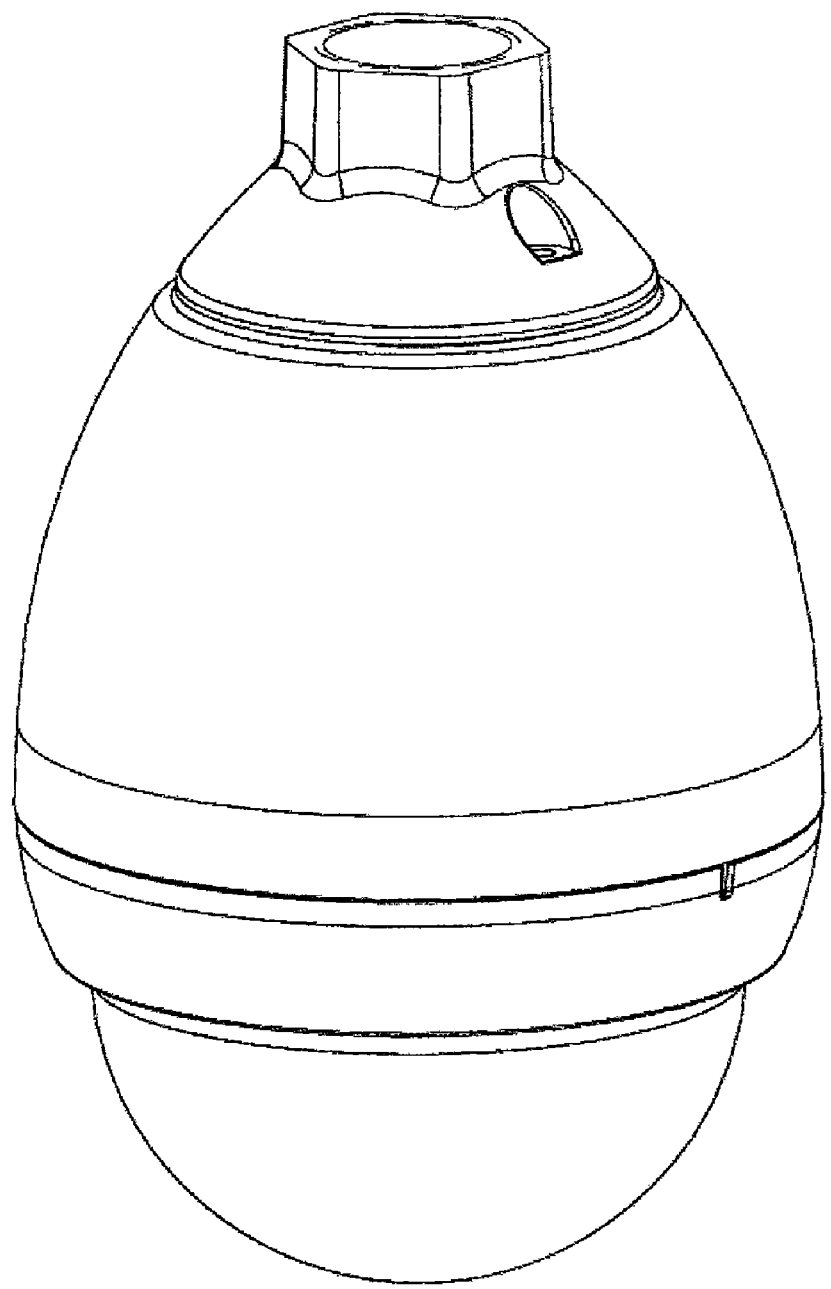
FIG. 1 is a perspective view of a pendant housing of the prior art including a stationary window.
Figure 2:
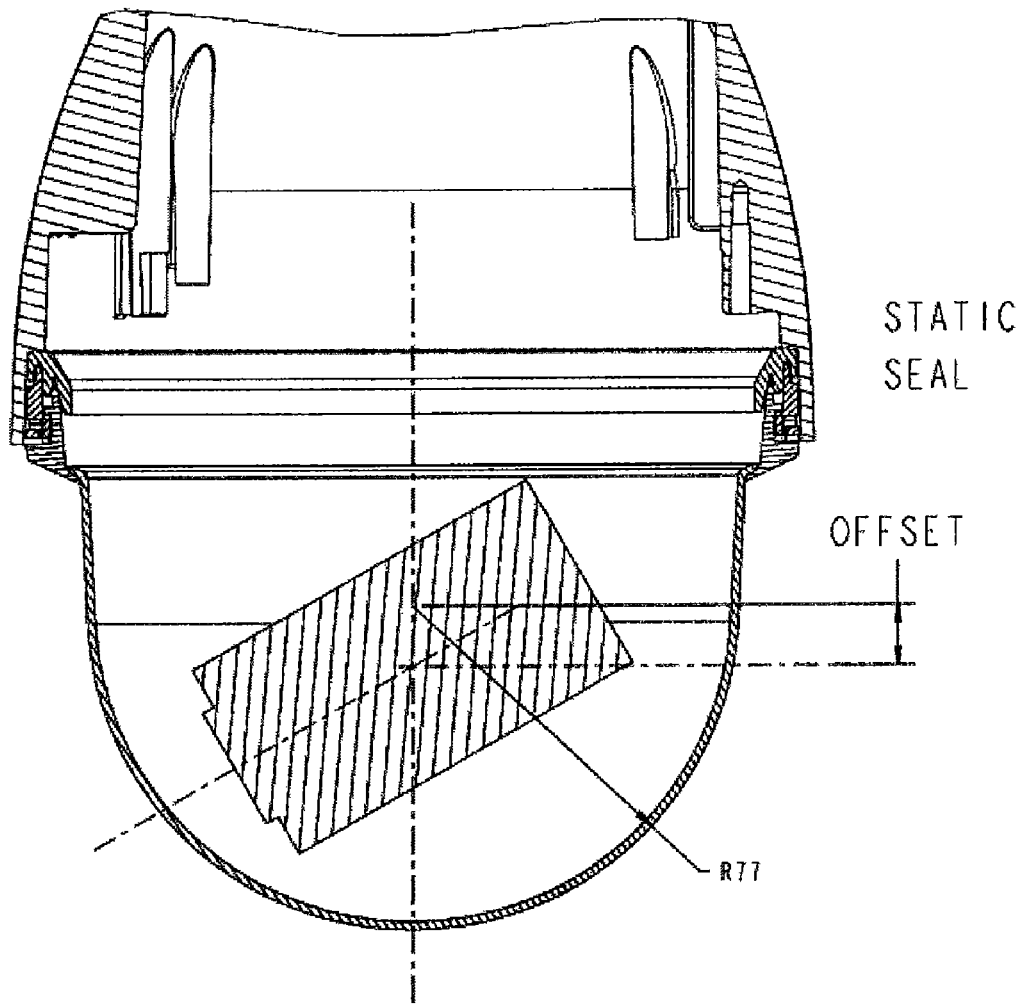
FIG. 2 is a side cross-sectional view of the prior art pendant housing of FIG. 1.
Figure 3:
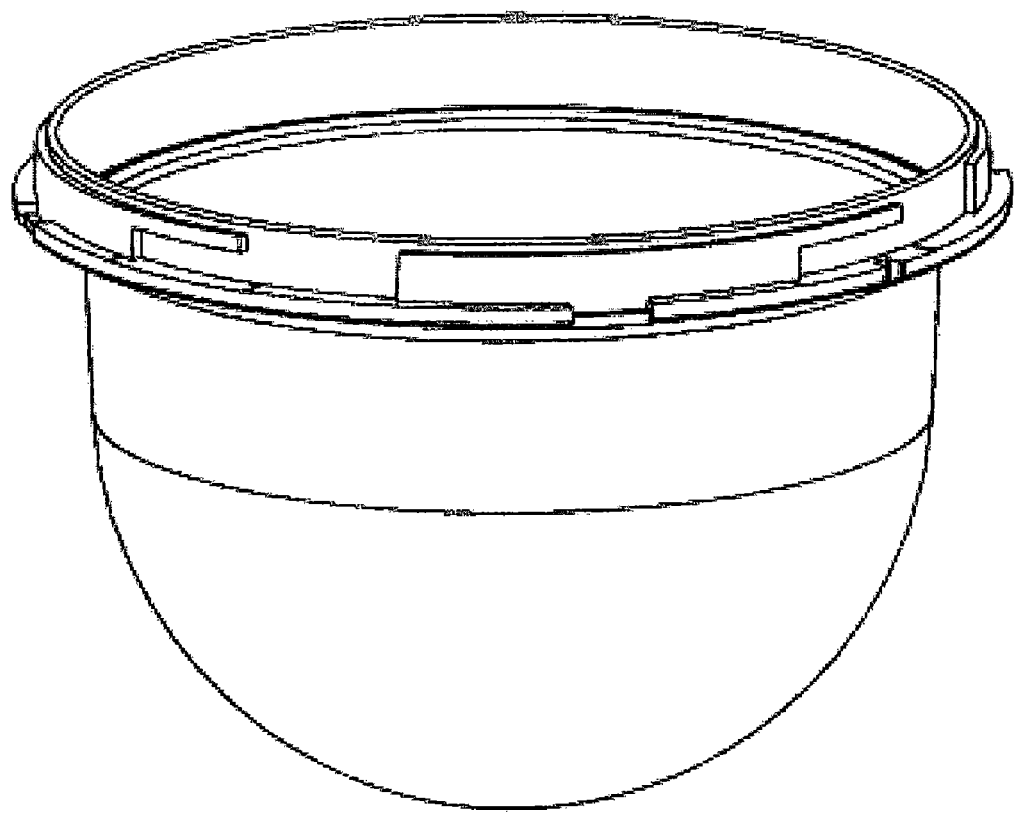
FIG. 3 is a perspective view of the hemispherical window of the prior art pendant housing of FIG. 1.
Figure 4:
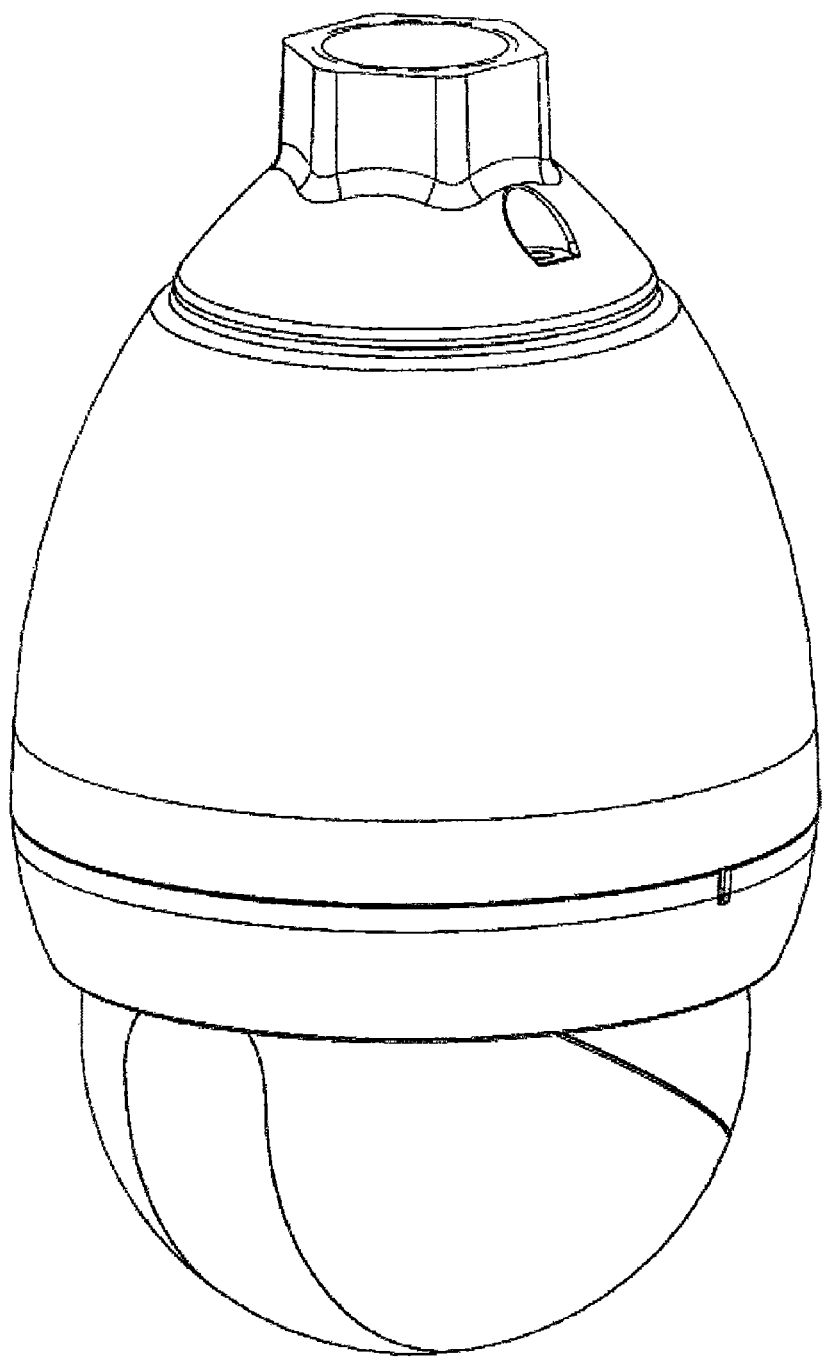
FIG. 4 is a perspective view of a pendant housing of the prior art including a window with pan rotation.
Figure 5:
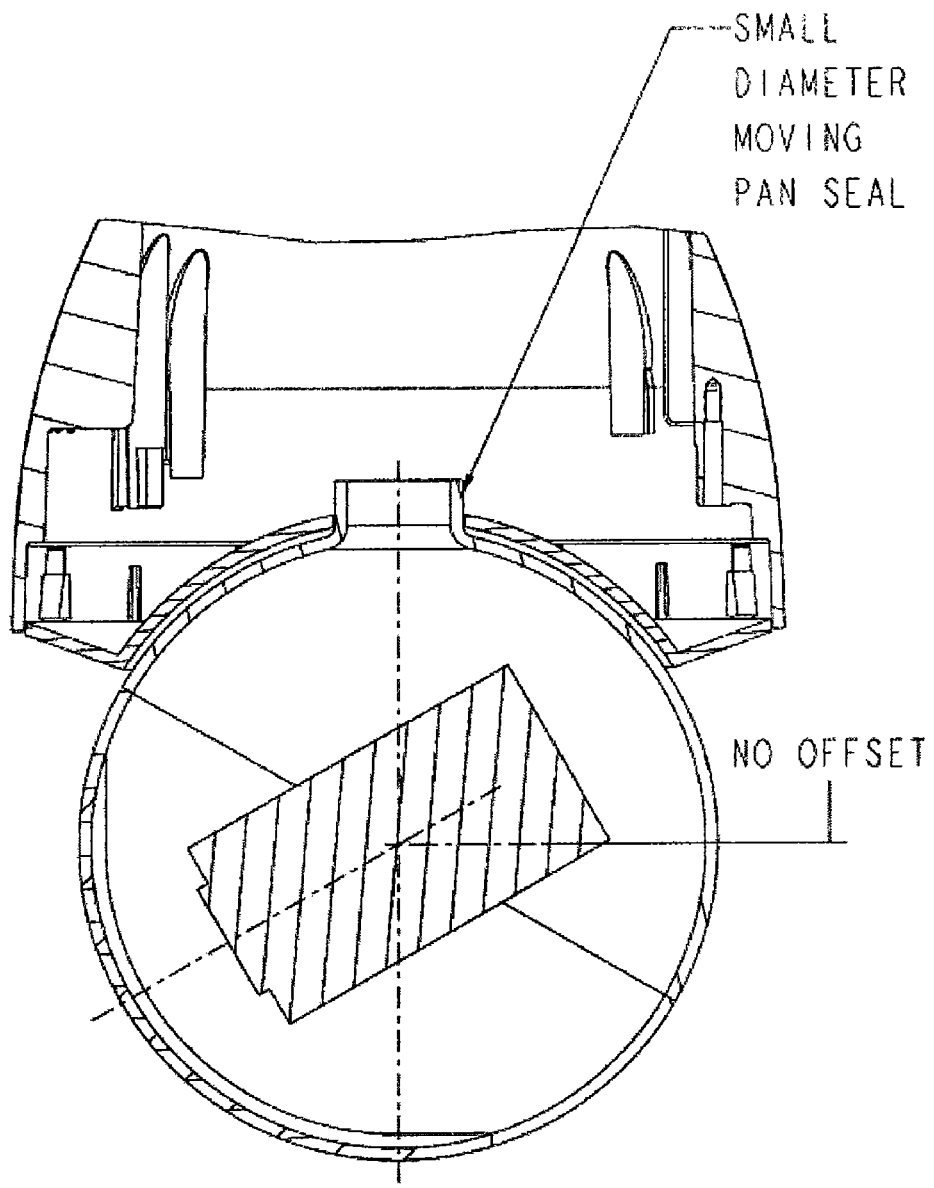
FIG. 5 is a side cross-sectional view of the prior art pendant housing of FIG. 4.
Figure 6:
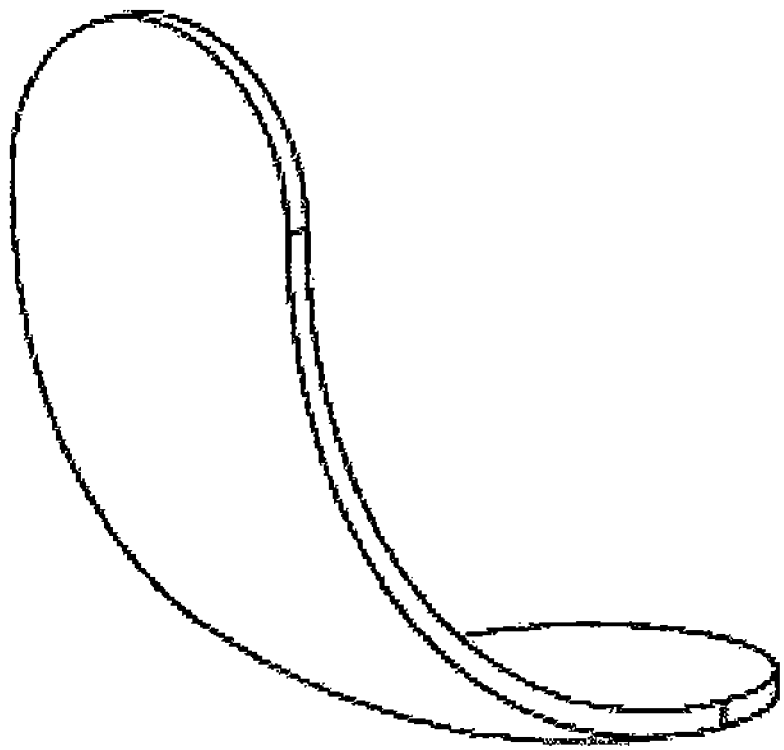
FIG. 6 is a perspective view of the optical region of the window of the prior art pendant housing of FIG. 4.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Figure 7:
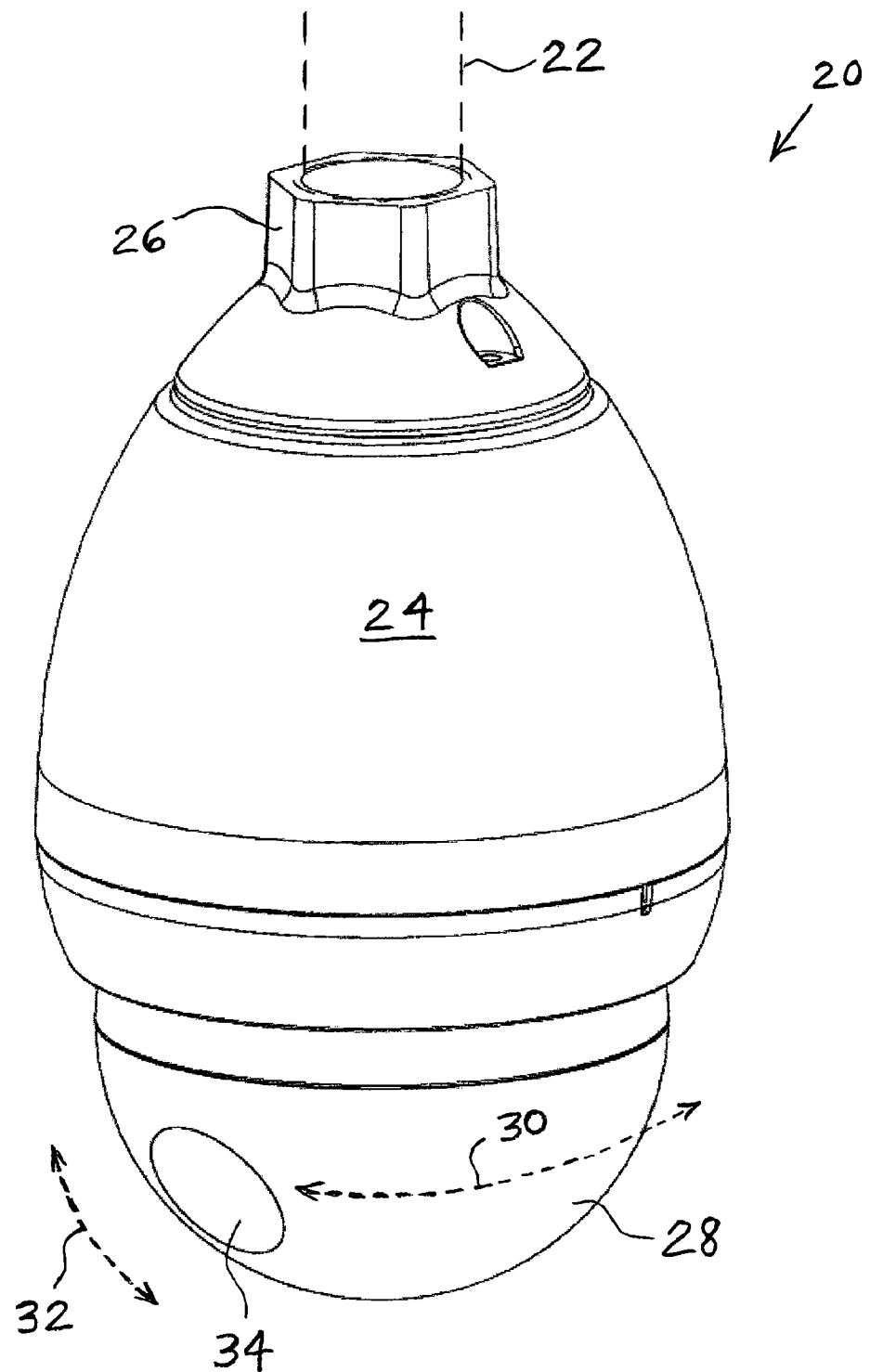
FIG. 7 is a perspective view of one embodiment of a surveillance camera arrangement of the present invention including an optical region with pan and tilt rotation.

Referring now to FIG. 7, there is shown one embodiment of a surveillance camera arrangement 20 of the present invention for attachment to a pipe 22 that is indicated in dashed lines. Surveillance camera arrangement 20 includes a pendant housing 24 coupled to a pipe collar 26 and to spherical window 28. As described in more detail below, window 28 is capable of rotating in both the pan directions 30 and the tilt directions 32. Window 28 includes a circular optical region 34, which may be flat as shown in isolation in FIG. 8, but may alternatively be curved to match the radius of the remainder of window 28, as shown in FIG. 9. Optical region 34 may have better optical qualities than the remainder of window 28 such that a camera head 36 may capture high quality images through optical region 34. A lens 38 of camera head 36 may have an optical axis 40 extending approximately through a midpoint 42 of region 34.

Like window 28, camera head 36 may be rotatable relative to the remainder of arrangement 20 in directions indicated by double arrow 30 about a pan axis or longitudinal axis 44. Also like window 28, camera head 36 may be rotatable relative to the remainder of arrangement 20 in directions indicated by double arrow 32 about a tilt axis that is oriented into the page of FIG. 9 at 46. A vertical level or position of the tilt axis, indicated at 48, is at the same vertical level/position as (e.g., is not offset from) the vertical midpoint or equator of window 28.

According to the invention, lens 38 and dome optical region 34 may be fixed together so that the size of optical region 34 may be limited to the small area shown in FIG. 7, but both camera lens 38 and window optical region 34 may move in unison about the pan and tilt axes while still maintaining the streamlined dome look shown in FIGS. 7 and 9.

Figure 8:
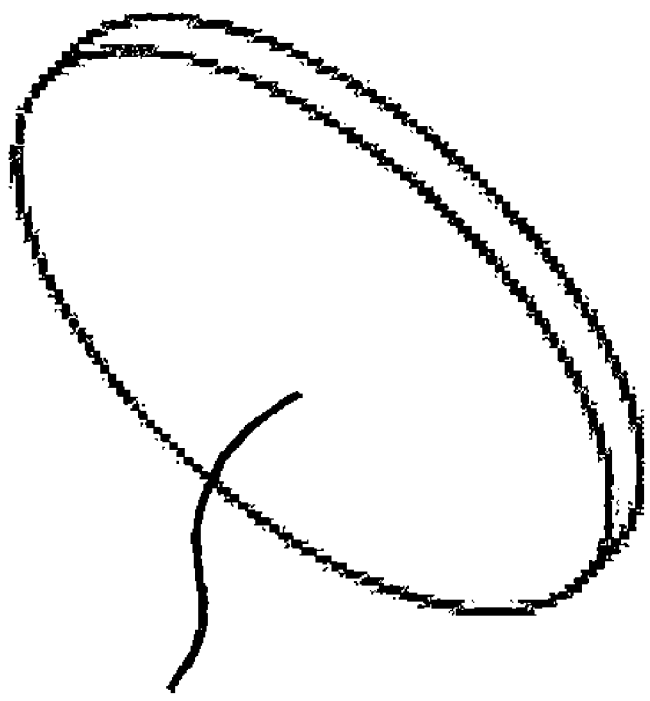
FIG. 8 is perspective view of the optical region of the window of the surveillance camera arrangement of FIG. 7.
Figure 9:
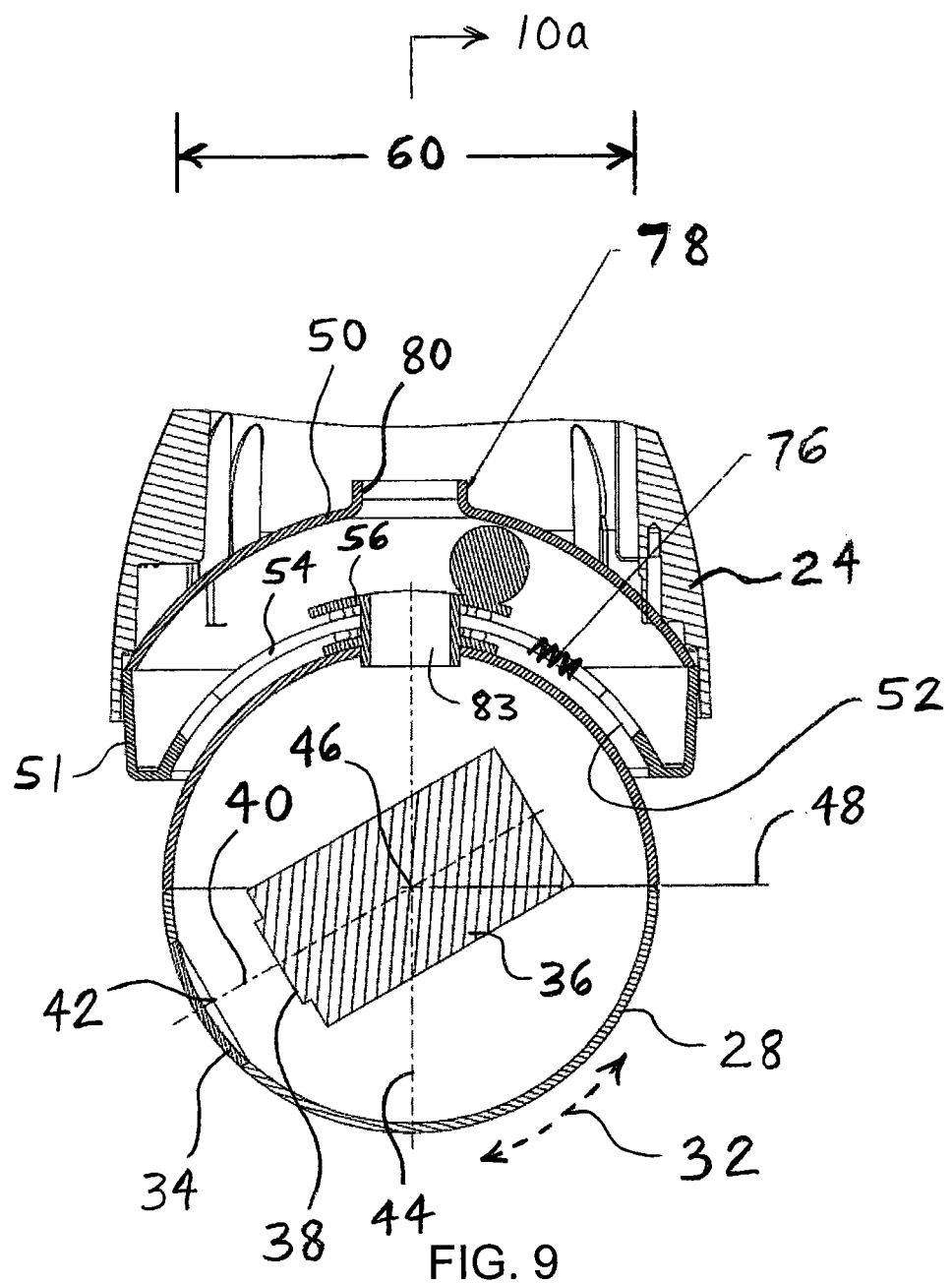
FIG. 9 is side cross-sectional view of the surveillance camera arrangement of FIG. 7.

As shown in FIGS. 7-9, camera lens 38 may be enclosed in a spherically-shaped "eyeball" window 28 with the small optical region 34 being aligned with optical axis 40 of lens 38. This eyeball assembly can be formed by two joined hemispheres, or by more than two portions of a sphere, as convenient. The joints between the parts that form the eyeball may be minimized in order to present the appearance of a continuous sphere, and so that it is difficult to see movement of the joints during panning and tilting of the camera and window.

Spherical eyeball window 28 is supported by a hollow extension in the form pipe 22 through which electrical connections may pass. This hollow extension protrudes into an intermediate "virtual tilt module" (VTM) 50 (FIG. 9). VTM 50 includes a hollow shell body 51 that is pivotable in tilt directions 32 relative to eyeball window 28. Body 51 may be rotatable relative to the remainder of arrangement 20 in directions indicated by double arrow 30 about a pan or longitudinal axis 44. Body 51 of VTM 50 has a curved shape to wrap around the top of eyeball 28 in at least one direction, such that the rotational axis of the surfaces of bottom wall 52 of VTM body 51 coincides with the desired camera lens tilt axis at 46.

An arcuate slot 54 is provided in bottom wall 52 of VTM body 51 so a hollow eyeball extension or coupling 56 can pass at least through slot 54. Slot 54 has a width 58 (FIG. 10a) that is large enough to allow hollow eyeball extension 56 to travel along the entire length 60 of slot 54 without obstruction. Slot 54 may be oriented or aligned in tilt direction 32. Bottom wall 52 of VTM body 51 has recessed bearing races 62a, 62b (FIG. 10b) on the top and bottom surfaces of wall 52, respectively. Races 62a-b are parallel to the length of slot 54. Races 62a-b accept inner and outer curvilinear bearing sets 64a-b, respectively, which may be attached to eyeball hollow extension 56.

Bearing sets 64a-b ride in the races 62a-b, respectively, on the top and bottom surfaces of VTM body bottom wall 52, such that eyeball window 28 is able to rotate around a virtual tilt axis at 46 without any pivoting hardware being located on the tilt axis or pivot point. For this reason, the tilt mechanism of the invention may be referred to as a "virtual" tilt mechanism.

Figure 10A:
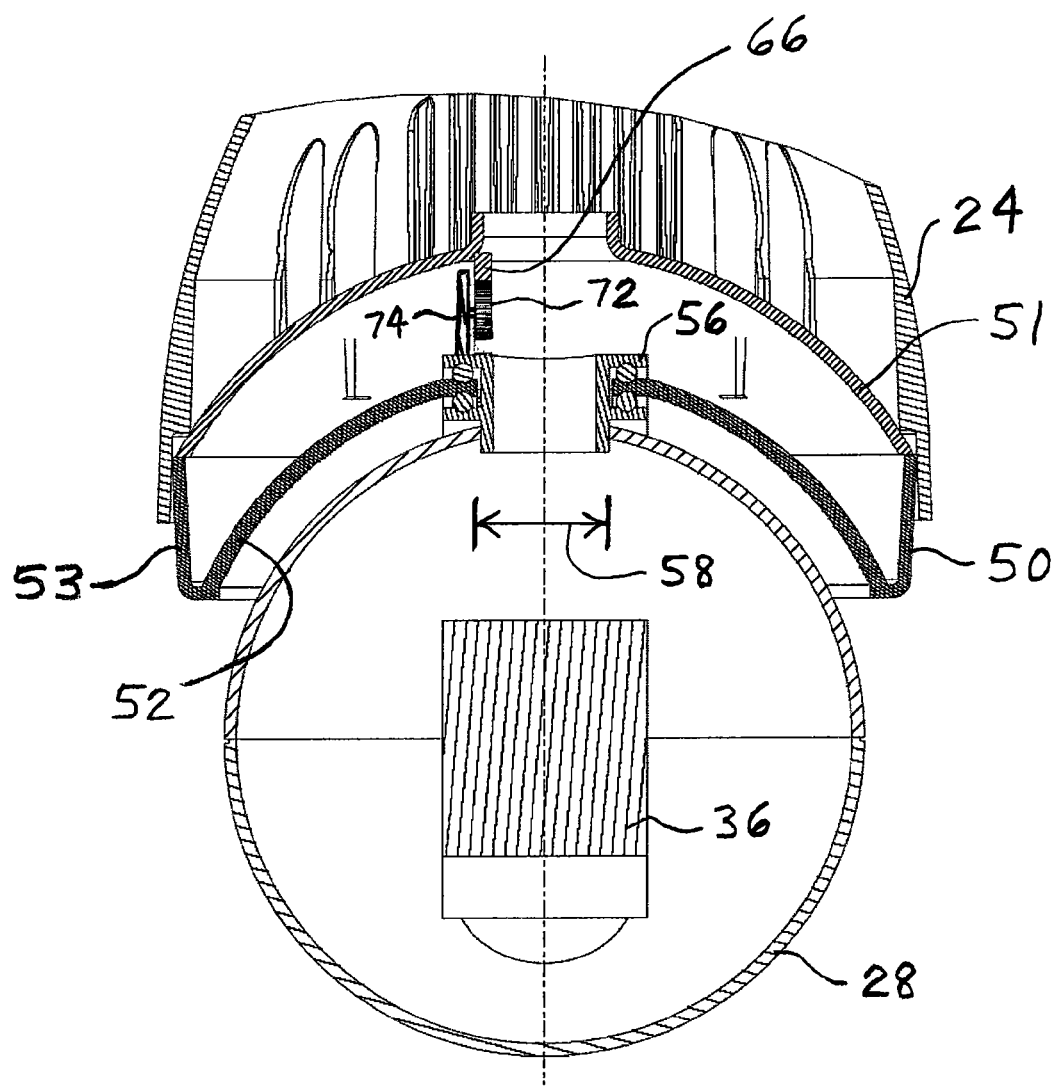
FIG. 10a is a cross-sectional view through line 10a-10a in FIG. 9, and with the camera pointing in a downward direction.
Figure 11:
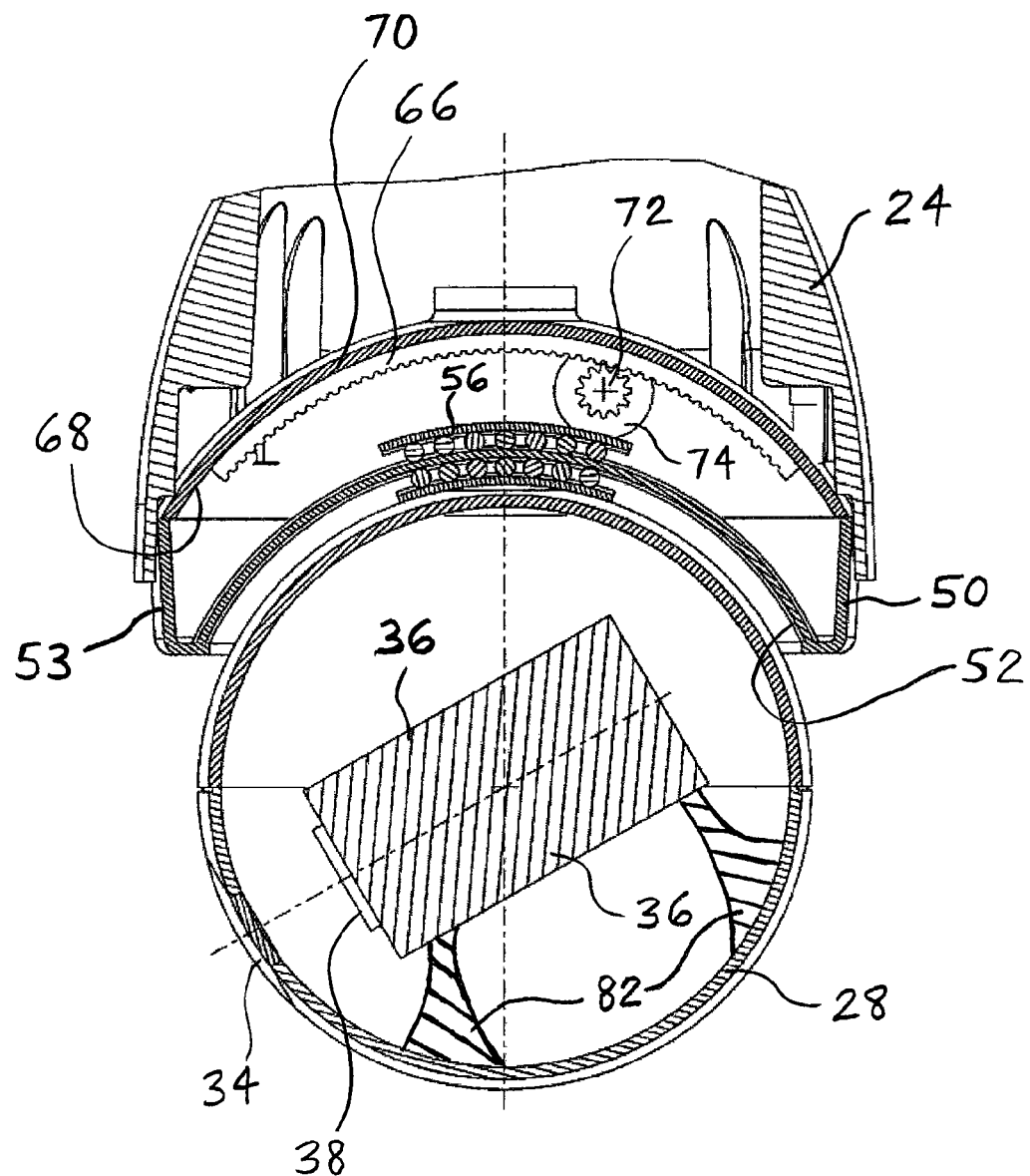
FIG. 11 is a cross-sectional view through the bearing races along line 11-11 in FIG. 10b.

As shown in the cross-sectional views of FIGS. 10a and 11, top bearing set 64a on the top of bottom VTM wall 52 constrains eyeball window 28 in the downward vertical direction. Bottom bearing set 64b on the bottom side of bottom VTM wall 52 constrains eyeball window 28 in the upward vertical direction.

Coupling 56 may be adhered to or attached by interference fit with a through hole at the top of eyeball window 28. Because the two bearing sets 64a-b are rigidly attached to hollow eyeball coupling 56, eyeball window 28 is also constrained in the sideways horizontal directions (e.g., left-to-right in FIG. 10a) by the fit of bearing sets 64a-b into races 62a-b. Therefore, the only remaining degree of freedom is for hollow eyeball protrusion 56 and associated bearing sets 64a-b to traverse the arcuate path in the slot direction (e.g., along an arc generally oriented from left-to-right in FIGS. 9 and 11).

VTM 50 includes a motive mechanism to remotely produce the relative movement of the eyeball window 28 with respect to VTM 50. In one embodiment, as shown in FIG. 11, the motive mechanism includes a motorized rack and pinion mechanism having an arcuate spur gear rack segment 66 attached to a lower or inside surface 68 of a top wall 70 of VTM 50. Top wall 70 may be parallel to or equidistant from bottom wall 52. An annular side wall 53 of body 51 may sealingly connect bottom wall 52 and top wall 70. Thus, body 51 of VTM 50 may have a same appearance from any viewing angle within the 360 degree arc around body 51, which may make it difficult for a human observer to visually discern whether body is panning.

Spur gear rack segment 66 mates with a spur pinion gear 72. Pinion gear 72 is fixed to the shaft of a motor 74. Pinion 72 may be drivably coupled to motor 74 and meshingly engaged with rack 66. In an alternative embodiment, a worm gear arrangement is substituted in place of spur rack segment 66 and mating pinion 72, where the "worm pinion" on the motor is attached to the eyeball via coupling 56, and the mating "worm gear segment" is attached to the VTM top portion 50a. The worm gear may occupy more space than spur rack segment 66 and mating pinion 72, but may provide advantages such as greater power and stability. Worm gears may be difficult to back-drive even if power is removed from the unit.

Motor 74 is attached to hollow eyeball extension 56 such that when motor 74 is energized in either rotational direction, eyeball window 28 tilts relative to VTM 50 in a corresponding direction. That is, movement of coupling 56 along slot 54 causes enclosure 28 to rotate about a tilt axis at 46.

Camera head 36 may be protected from dirt and moisture in the environment by elastomeric seals at the interface between eyeball window 28 and the bottom of VTM 50, and at the interface between the top of VTM 50 and camera housing 24. More particularly, one or more accordion-style seals 76, one of which is only fragmentarily indicated in FIG. 9, may be used to cover slot 54 in bottom wall 52 of VTM 50. The perimeter of accordion seal 76 may be attached to the perimeter of VTM bottom wall 52 at one or more points that are some distance away from slot 54. An interior opening (not shown) in accordion-style seal 76 may be attached to the top of eyeball window 28 near hollow extension 56. The elastomeric material of accordion seal 76 stretches and the folds of seal 76 flex as hollow extension coupling 56 traverses the length of slot 54 and as eyeball window 28 tilts. Thus, the tilting movement may occur with minimal additional force while the seal is still maintained. In one embodiment, two accordion-style seals 76 are provided in slot 54 on opposite sides of coupling 56.

A small-diameter moving pan seal 78 at a hollow flange 80 on top wall 70 of VTM 50 may be a friction-type pan seal. The relatively small diameter of seal 78 may reduce the force required to overcome the seal friction.

Figure 12:
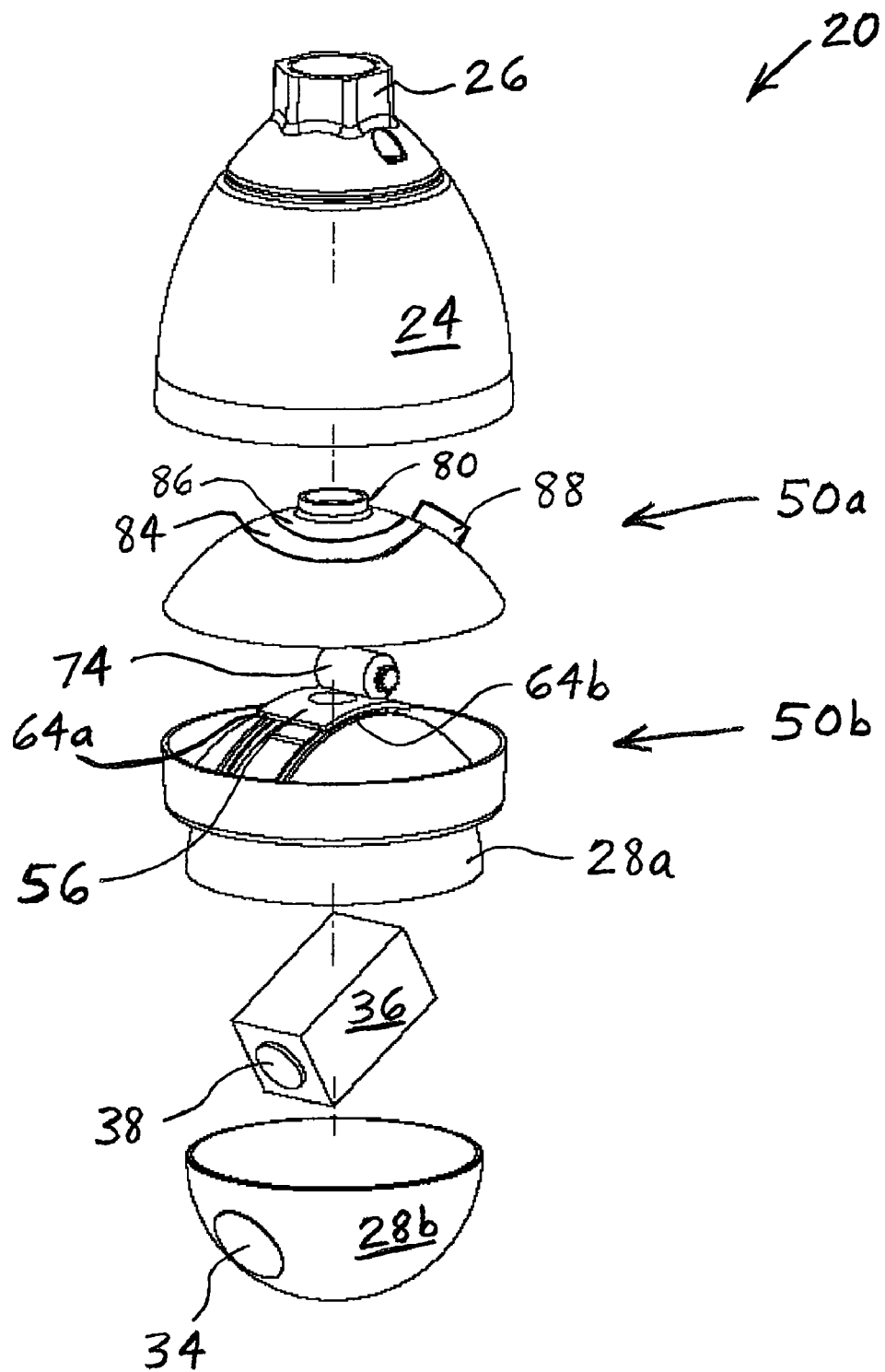
FIG. 12 is an exploded view of the surveillance camera arrangement of FIG. 7.

As shown in the exploded view of FIG. 12, arrangement 20 may include pendant housing 24, VTM 50, camera head 36, and a hemispherical lower eyeball window 28b. VTM 50 may include a VTM top portion 50a including spur gear rack segment 66, which is not visible in FIG. 12. VTM 50 may also include a VTM bottom portion 50b including motor 74, tilt bearings 64a-b, and a hemispherical upper eyeball window 28b. During manufacture, after the wires of camera head 36 are threaded through extension 56, flange 80, collar 26 and pipe 22, the perimeter of lower eyeball window 28b may be adhered or otherwise sealingly attached to the perimeter of upper eyeball window 28a.

Structure 82, which is only schematically indicated in FIG. 11, may rigidly attach camera head 36 to the inside of eyeball window 28. In one embodiment, structure 82 directly attaches camera head 36 to only lower eyeball window 28b. Thus, during manufacture, camera head 36 and lower eyeball window 28b may be joined as an assembly to upper eyeball window 28a.

The wires that transmit power, control signals, and video signals between the camera head 36 and an electronic controller are not shown in the drawings. These wires would be routed through a through channel 83 of hollow eyeball extension 56 and then through flange 80 in top wall 70 of VTM 50. The controller may be disposed at a remote location that is disposed perhaps several hundred yards away from arrangement 20, and is also not shown in the drawings.

Flange 80 in top wall 70 of VTM 50 may be attached to a pan bearing 84, depicted only schematically in FIG. 12, thus allowing the combined assembly of VTM 50 and eyeball window 28 to rotate in the pan directions. A slip ring 86, also shown only schematically in FIG. 12, may be located on the pan axis to allow 360 degree continuous rotation. A panning motor 88, which is also shown only schematically in FIG. 12, may be disposed within pendant housing 24, and may drive the panning rotational movement of VTM 50, eyeball window 28 and camera head 36.

A tilt mechanism of the invention may include coupling 56, motor 74, pinion 72, and rack 66. Coupling 56 may interconnect tiltable enclosure 28 with a non-tiltable structure of the invention. The non-tiltable structure may include VTM 50, which has a bottom arcuate wall 52 substantially conforming to a portion of an outer surface of the substantially spherical enclosure 28. That is, bottom arcuate wall 52 substantially conforms to a portion of the enclosure's outer surface that bottom wall 52 is adjacent to. Bottom wall 52 has an arcuate through slot 54. Coupling 56 of the tilt mechanism may be attached to enclosure 28 and may be slidably coupled to bottom wall 52 in through slot 54. Motor 74 may rotate pinion 72 and thereby cause pinion 72 to traverse rack 66, coupling 56 to slide in slot 54, and enclosure 28 to tilt relative to the non-tiltable structure.

An upper surface of bottom wall 52 may include two upper races 62a. Each upper race 62a may extend parallel to through slot 54 and may be disposed adjacent to a respective one of two longitudinal edges 75 (FIG. 10b) of through slot 54. A lower surface of bottom wall 52 may include two lower races 62b. Each lower race 62b may extend parallel to through slot 54 and may be disposed adjacent to a respective one of two longitudinal edges 75 of through slot 54. The tilt mechanism may include two bearing sets 64a-b. Each of bearing sets 64a-b may be received in a respective pair of races 62a-b along a respective one of two longitudinal edges 75 of through slot 54. Coupling 56 may be coupled to each of bearing sets 64a-b such that coupling 56 is slidable along lengths of races 62a-b. Coupling 56 is slidably coupled to bottom wall 52 by bearing set 64a along a first longitudinal edge 75 of slot 54 and by bearing set 64b along a second longitudinal edge 75 of slot 54.

Coupling 56 may include an upper substantially horizontal flange 77 (FIG. 10b) and a lower substantially horizontal flange 79. Bearing sets 64a-b may be disposed between flanges 77 and 79. Each of the two longitudinal edges 75 of bottom wall 52 may be sandwiched between a respective bearing set 64a-b.

During use, camera head 36 may undergo pan, tilt and zoom movements in response to autotracking control signals from the controller. In addition, or alternatively, a human operator may transmit control signals, such as by use of a keyboard or joystick (not shown), to arrangement 20 instructing camera head 36 to undergo pan, tilt and zoom movements. Regardless of the source of the control signals, the control signals may be received by and responded to by the panning motor, motor 74 and a zooming motor (not shown) within camera head 36.

In response to tilting commands, camera head 36 and eyeball window 28 (including both upper eyeball window hemisphere 28a and lower eyeball window hemisphere 28b) undergo tilting movements in unison such that lens 38 is maintained in alignment with the middle of optical region 34. In response to panning commands, camera head 36, eyeball window 28 and VTM 50 (including both upper VTM 50a and lower VTM 50b) undergo panning movements in unison such that, here too, lens 38 is maintained in alignment with the middle of optical region 34. In response to zooming commands, camera head 36 may internally adjust a distance between lens 38 and optical region 34 along optical axis 40, while keeping lens 38 in alignment with the middle of optical region 34.

While this invention has been described as having an exemplary design, the present invention may be further modified within the spirit and scope of this disclosure. This application is therefore intended to cover any variations, uses, or adaptations of the invention using its general principles.

What is claimed is:

1. A surveillance camera arrangement including:
    a substantially spherical enclosure including a substantially round optical region, the optical region having better optical qualities than a remainder of the enclosure;
    a camera disposed within and fixedly attached to the enclosure, the camera having a lens with an optical axis extending approximately through the optical region; and
    actuating means coupled to the enclosure and to the camera, the actuating means being for pivoting both the enclosure and the camera in both pan and tilt directions such that the optical axis of the camera remains substantially aligned with the optical region, the actuating means including a tilt module pivotably coupled to the substantially spherical enclosure, the tilt module including a motorized rack and pinion mechanism configured to actuate the enclosure in the tilt directions relative to a body of the tilt module, a bottom wall of the tilt module body is disposed adjacent to the enclosure, the bottom wall including an arcuate, rectangular through slot, the rack and pinion mechanism including a coupling received within the slot, attached to the enclosure, and slidably coupled to the bottom wall of the tilt module body, an upper surface of the bottom wall including two upper races, each said upper race extending parallel to the through slot and being disposed adjacent to a respective one of two longitudinal edges of the through slot, a lower surface of the bottom wall including two lower races, each said lower race extending parallel to the through slot and being disposed adjacent to a respective one of the two longitudinal edges of the through slot, the rack and pinion mechanism including two bearing sets, each said bearing set being received in a respective pair of the races along a respective one of the two longitudinal edges of the through slot, the coupling being coupled to each of the bearing sets such that the coupling is slidable along lengths of the races.

2. The arrangement of claim 1 wherein actuation of the rack and pinion mechanism causes the coupling to slide along a length of the through slot.

3. The arrangement of claim 1 wherein the coupling includes a through channel, at least one wire being attached to the camera and extending through the through channel.

4. The arrangement of claim 1 wherein the coupling is attached to a motor of the rack and pinion mechanism.

5. A surveillance camera arrangement, comprising:
    a substantially spherical enclosure including an optical region, the optical region having better optical qualities than other portions of the enclosure;
    a camera disposed within and fixedly attached to the enclosure, the camera having a lens with an optical axis extending through said optical region; and
    an actuatable tilt mechanism coupled to the enclosure and to a virtual tilt module including a bottom arcuate wall substantially conforming to a portion of an outer surface of the substantially spherical enclosure, the bottom wall having an arcuate through slot, the tilt mechanism including a coupling attached to the enclosure and slidably coupled to the bottom wall in the through slot, the tilt mechanism being configured to pivot the enclosure in tilt directions relative to the virtual tilt module, an upper surface of the bottom wall including two upper races, each said upper race extending parallel to the through slot and being disposed adjacent to a respective one of two longitudinal edges of the through slot, a lower surface of the bottom wall including two lower races, each said lower race extending parallel to the through slot and being disposed adjacent to a respective one of the two longitudinal edges of the through slot, the tilt mechanism including two bearing sets, each said bearing set being received in a respective pair of the races along a respective one of the two longitudinal edges of the through slot, the coupling being coupled to each of the bearing sets such that the coupling is slidable along lengths of the races.

6. The arrangement of claim 5 wherein the at least one optical region comprises a single substantially round optical region.

7. The arrangement of claim 6 wherein the optical axis of the lens extends approximately through a midpoint of the optical region.

8. The arrangement of claim 5 wherein the tilt mechanism includes a motor attached to the coupling, a pinion being drivably coupled to the motor, the pinion engaging a rack, the motor being configured to rotate the pinion such that the coupling, motor and pinion traverse a length of the rack.

9. The arrangement of claim 8 wherein virtual tilt module includes a top arcuate wall substantially parallel to the bottom arcuate wall, the rack being attached to a bottom surface of the top arcuate wall.

10. A surveillance camera arrangement, comprising:
   a substantially spherical enclosure including an optical region, the optical region having better optical qualities than other portions of the enclosure;
   a camera disposed within and fixedly attached to the enclosure, the camera having a lens with an optical axis extending through one said optical region;
   a non-tiltable structure including:
      an arcuate bottom wall having an arcuate slot oriented in a tilt direction in which the enclosure is tiltable, the bottom wall being adjacent to and conforming to a portion of an outer surface of the spherical enclosure; and
      an arcuate top wall substantially equidistant from the bottom wall;
   a coupling attached to the enclosure and slidably received in the slot of the bottom wall;
   a motor attached to the coupling and disposed between the bottom wall and the top wall;
   a pinion drivably coupled to the motor; and
   a rack attached to a bottom surface of the top wall and meshingly engaged with the pinion.

11. The arrangement of claim 10 wherein the motor is configured to rotate the pinion and thereby cause:
   the pinion to traverse the rack;
   the coupling to slide in the slot; and
   the enclosure to tilt relative to the non-tiltable structure.

12. The arrangement of claim 11 wherein the coupling is slidably coupled to the bottom wall by a first bearing set along a first longitudinal edge of the slot and by a second bearing set along a second longitudinal edge of the slot.

13. The arrangement of claim 10 wherein the coupling includes a through channel, at least one wire being attached to the camera and extending through the through channel.

14. The arrangement of claim 10 wherein the rack is arcuate and is oriented in the tilt direction.

15. The arrangement of claim 14 further comprising at least one accordion-style seal disposed in the slot.

* * * * *